(12) United States Patent
Boulakhov et al.

(10) Patent No.: US 10,661,362 B2
(45) Date of Patent: May 26, 2020

(54) FLUTED CUTTING TOOL CONFIGURATION AND METHOD THEREFOR

(71) Applicant: Hanita Metal Works Ltd., Nahariya (IL)

(72) Inventors: Sergei Boulakhov, Nahariya (IL); Leonid Sharivker, Nahariya (IL)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/622,920

(22) Filed: Jun. 14, 2017

(65) Prior Publication Data

US 2017/0361384 A1 Dec. 21, 2017

(30) Foreign Application Priority Data

Jun. 15, 2016 (IL) .......................................... 246227

(51) Int. Cl.
*B23C 5/28* (2006.01)
*B23B 51/06* (2006.01)
*B23C 5/10* (2006.01)

(52) U.S. Cl.
CPC .................. *B23C 5/28* (2013.01); *B23C 5/10* (2013.01); *B23B 51/06* (2013.01); *B23C 2210/402* (2013.01); *B23C 2230/04* (2013.01); *B23C 2250/12* (2013.01)

(58) Field of Classification Search
CPC ....... B23B 51/06; B23B 2250/12; B23C 5/28; B23C 5/10; B23C 2210/402
See application file for complete search history.

(56) References Cited

U.S. PATENT DOCUMENTS

| | | | |
|---|---|---|---|
| 2,008,031 A * | 7/1935 | Miltner | .................. B23B 51/02 408/56 |
| 2,322,894 A | 6/1943 | Stevens | |
| 5,160,232 A | 11/1992 | Maier | |
| 5,509,761 A * | 4/1996 | Grossman | ........... B23B 51/0493 408/223 |

(Continued)

FOREIGN PATENT DOCUMENTS

| CN | 203401128 U | 1/2014 |
|---|---|---|
| CN | 1037222299 A | 4/2014 |

(Continued)

OTHER PUBLICATIONS

Nov. 21, 2017 Search Report P15-06053-GB-NP.
Mar. 12, 2018—Search Report.
Apr. 24, 2018 Office Action (non-US).

*Primary Examiner* — Ryan C Rufo
(74) *Attorney, Agent, or Firm* — Larry R. Meenan

(57) ABSTRACT

One aspect of the invention provides a cutting tool used for peripheral cutting operations, comprising: a plurality of peripheral cutting edges, and a plurality of flutes disposed between the peripheral cutting edges, wherein each of the flutes includes at least one surface, and at least one depression recessed into the at least one flute surface, wherein each of the depressions defines a depression interior configured to trap cooling liquid during operation of the cutting tool, and wherein at least one of the depressions is dimensioned and disposed to enhance heat dissipation at least one of the peripheral cutting edges.

16 Claims, 9 Drawing Sheets

(56) References Cited

U.S. PATENT DOCUMENTS

| | | | | |
|---|---|---|---|---|
| 5,967,710 | A * | 10/1999 | Krenzer | B23B 27/141 408/224 |
| 6,030,155 | A * | 2/2000 | Scheer | B23B 51/02 408/59 |
| 9,144,845 | B1 * | 9/2015 | Grzina | B23B 27/00 |
| 2009/0142150 | A1 | 6/2009 | Chu | |
| 2012/0082518 | A1 * | 4/2012 | Woodruff | B23C 5/109 407/11 |
| 2013/0302102 | A1 * | 11/2013 | Green | B23B 51/02 408/144 |
| 2015/0328696 | A1 | 11/2015 | Wang | |
| 2016/0151842 | A1 | 6/2016 | Bjork et al. | |

FOREIGN PATENT DOCUMENTS

| | | | | |
|---|---|---|---|---|
| CN | 204108421 U | | 1/2015 | |
| CN | 104690763 A | | 6/2015 | |
| CN | 204657590 U | | 9/2015 | |
| DE | 102008051573 A1 * | | 4/2010 | B23B 51/00 |
| GB | 183005 | | 7/1922 | |
| GB | 452750 | | 8/1936 | |
| GB | 2184373 | | 10/1989 | |
| JP | 05-044012 A * | | 2/1993 | C23C 14/02 |
| JP | 06-091416 A * | | 4/1994 | B23B 51/00 |
| JP | 2005-319544 A * | | 11/2005 | B23B 51/00 |
| JP | 2009078346 | | 4/2009 | |
| WO | WO9703792 | | 2/1997 | |
| WO | WO 2017169303 A1 * | | 10/2017 | B21D 37/20 |

\* cited by examiner

FLUTED CUTTING TOOL CONFIGURATION AND METHOD THEREFOR

RELATED APPLICATION DATA

The present application claims priority pursuant to 35 U.S.C. § 119(a) to Israel Patent Application Number 246227, filed Jun. 15, 2016 which is hereby incorporated by reference in its entirety.

FIELD

Embodiments of the invention, as broadly contemplated herein, relate to the field of industrial cutting tools, by which metal or other material is cut in a predetermined fashion. More particularly, embodiments of the invention, as broadly contemplated herein, relate to a cutting tool that has a flute configuration promoting increased tool life and material removal rate, and improved surface finish of a workpiece, all as a result of unique chip formation and an improved cooling of flute surfaces.

BACKGROUND

Many cutting tools have helical flutes through which chips are evacuated after being cut from a workpiece. The flutes tend to clog, and tool cutting efficiency is thereby reduced if the chips are not adequately removed; if this problem is not treated over time it can eventually lead to tool failure. To the extent that heat is also generated while a workpiece is being cut and the formed chips are being evacuated, care must also be taken for cooling liquid (or cooling air) to be properly introduced into the flutes.

The evacuation of chips is often complicated by even more significant heat generation. Particularly, when the flutes are partially or completely clogged, many chips often do not end up being exposed to the cooling liquid, thereby resulting in high friction and very high chip temperatures; as such, the extra heat generated thereby is transferred to the cutting surfaces. Accordingly, thermal cracking is liable to develop at the cutting edges, along with other types of wear deriving from excessive temperature variations caused by intermittent machining and an unreliable (e.g., fluctuating) supply of cooling liquid.

Based at least on the foregoing, it is recognized that it would be desirable to provide a structure within the flutes themselves that could help significantly reduce the thermal load to which cutting edges and flute surfaces are exposed.

U.S. Pat. No. 5,509,761 discloses a drill having a plurality of grooves that extend in the chip-discharging direction and are formed in an inner surface portion of each chip-discharging flute. This ensures a smoother discharge of chips by reducing the area of contact between the inner surface portion and the chips flowing therealong; consequently, this reduces the friction acting between such elements.

However, U.S. Pat. No. 5,509,761 is not instructive for treating problems encountered in end mills or other cutting tools that are involved in peripheral cutting operations; there, the peripheral cutting edge of the flutes is instrumental in chip formation as well as being involved in end face cutting operations, while a drill bit (e.g., as in U.S. Pat. No. 5,509,761) participates in an end cutting operation only at its point angle.

Thus, the flutes of U.S. Pat. No. 5,509,761 are used only for chip evacuation and are not exposed to cutting-derived friction.

In connection with the above, it can be noted that the grooves in U.S. Pat. No. 5,509,761 would be highly incapable of significantly dissipating any heat generated by a tool during a cutting operation or from chips being evacuated; this would hold true even if cooling liquid were present. Thus, while the noted grooves may be intended to reduce friction during the discharge of chips, they are not at all configured for promoting heat dissipation. Additional drawbacks that would be encountered in that regard include, but are not limited to: weakening of the flute, to the extent that the grooves are positioned throughout the flute inner surface; and a prospective negligible dwelling time of cooling liquid within a groove, wherein any potential cooling ability is significantly diminished based on a relatively rapid flow of cooling liquid through the continuous and elongated grooves.

SUMMARY

In summary, one aspect of the invention provides a cutting tool used for peripheral cutting operations, comprising: a plurality of peripheral cutting edges, and a plurality of flutes disposed between the peripheral cutting edges, wherein each of the flutes includes at least one surface, and at least one depression recessed into the at least one flute surface, wherein each of the depressions defines a depression interior configured to trap cooling liquid during operation of the cutting tool, and wherein at least one of the depressions is dimensioned and disposed to enhance heat dissipation at at least one of the peripheral cutting edges.

Another aspect of the invention provides a cutting tool comprising: a plurality of end face cutting edges, and a plurality of flutes which terminate, with respect to an axial direction of the cutting tool, at the end face cutting edges, wherein each of the flutes has at least one flute surface and includes at least one depression recessed into the at least one flute surface, wherein each of the depressions defines a depression interior configured to trap cooling liquid during operation of the cutting tool, and wherein at least one of the depressions is dimensioned and disposed to enhance heat dissipation at at least one of the end face cutting edges.

A further aspect of the invention provides a method for maximizing heat dissipation during a material removal operation performed with a fluted cutting tool, comprising the steps of: a) forming at least one depression for promoting cooling, the at least one depression being recessed into a flute surface of the cutting tool at a predetermined region of the flute surface, wherein the predetermined region of the flute surface is friction-prone during the material removal operation in connection with a predetermined tool cutting speed and a predetermined workpiece feed speed; b) operating a machine tool, with which the cutting tool is coupled at the predetermined tool cutting speed and the predetermined workpiece feed speed, to initiate the material removal operation with respect to the workpiece; and c) causing chips formed during the material removal operation to flow along the flute surface and across the at least one depression while being supported by one or more ribs adjoining each of the at least one depression, until being discharged from the cutting tool, to facilitate an increase in heat dissipation as a result of a reduction in chip-flute contact area.

For a better understanding of exemplary embodiment of the invention, together with other and further features and advantages thereof, reference is made to the following description, taking in conjunction with the accompanying drawings, and the scope of the claimed embodiments of the invention will be pointed out in the appended claims.

DETAILED DESCRIPTION OF PREFERRED EMBODIMENTS

Figure 1:
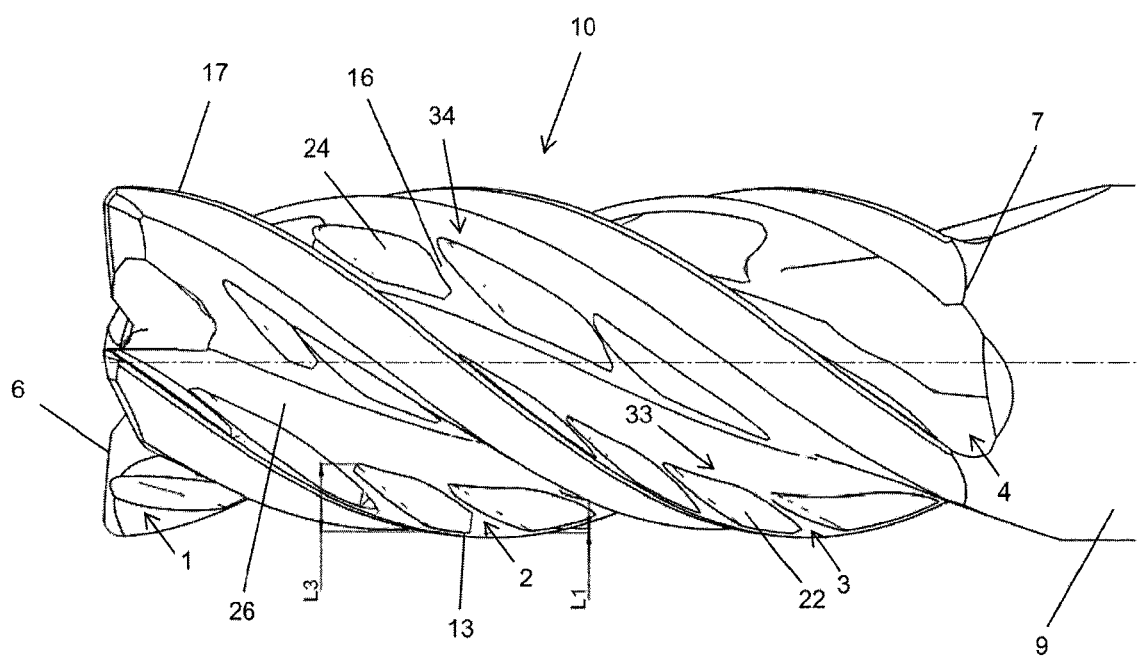
FIG. 1 is a partial side view of the cutting head of a cutting tool according to one embodiment of the present invention, showing the formation of depressions.

Broadly contemplated herein, in accordance with at least one embodiment of the invention, are arrangements for providing an intra-flute structure of a cutting tool that helps to significantly increase heat dissipation from the tool or from chips being evacuated. Also broadly contemplated herein is a structurally strong intra-flute structure of a cutting tool (e.g., that is involved in peripheral cutting operations) that significantly promotes cooling. Further, there is broadly contemplated herein an intra-flute structure of a cutting tool, for promoting cooling, that can be economically produced. Other aspects and advantages of embodiments of the invention will become apparent as the description proceeds.

A rotary cutting tool, according to embodiments of the present invention, is configured with a plurality of depressions arranged in a manner for promoting cooling, wherein each depression is recessed into a flute surface. The depressions may be segmented, i.e., so that each one is defined by predetermined dimensions and is surrounded or flanked by one or more strengthening ribs; this ensures that each one is spaced by a minimum distance from a neighboring depression. To the extent that the term "depression" (and its derivatives) is employed herein, it should be understood that, in accordance with embodiments of the invention, the term may be considered to be interchangeable with analogous terms such as "deepening", "indentation", "recess", "hollow" or "pit". Additionally, as referred to herein, the terms "surround", "completely surround", and their derivatives, can be understood to mean that an unrecessed rib, i.e. a piece of the flute face, adjoins a depression border in all directions in order to ensure structural integrity of the border; at the same time, a given rib need not necessarily be continuous as it may well be locally interrupted as a result of an abutment between borders of two different depressions.

From the ensuing discussion, it will be appreciated that, in accordance with at least one embodiment of the invention, at least one depression—recessed into at least one flute surface—can be dimensioned and disposed to enhance heat dissipation at at least one peripheral cutting edge, or at at least one end face cutting edge. Within the general scope of embodiments of the invention, it can be appreciated that a great variety of configurations are possible in this regard. Generally, at least one depression may preferably be dimensioned so as to retain or trap cooling liquid during a cutting operation, while its proximity to at least one cutting edge may be tailored so as to better influence or enhance heat dissipation at the at least one cutting edge. Specific embodiments are discussed herein with sample dimensions, and locations, for such depressions, that can help bring about the advantages just mentioned. Further details relating to embodiments of the invention will certainly be appreciated from the ensuing discussion.

As will be further appreciated herebelow, cooling liquid introduced into the flutes will be trapped within the depressions, thereby increasing the dwelling time of cooling liquid within the flute. Accordingly, this significantly increases the exposure time of chips (being evacuated through the flutes) to cooling liquid in comparison to conventional cutting tools. Also, in addition to facilitating superior heat dissipation, the cooling liquid received (and held) in the depressions will serve to lubricate chips passing through the flute and thus improve their passage therethrough, especially if the cooling liquid is oil-based.

As another feature in accordance with embodiments of the invention, the relative location (or positioning) of depressions with respect to a flute surface can be predetermined or selected to coincide with known regions of significant heat generation on the flute surface (wherein, e.g., such heat generation may result from machining operations or from chip-flute contact during chip evacuation).

Although the following description relates to end mills, it will be appreciated that embodiments of the invention may also (or alternatively) be implemented on other types of fluted cutting tools that are used for peripheral cutting operations, or even for end cutting operations (e.g., face mills).

FIG. 1 illustrates an end mill 10 according to an embodiment of the present invention; it is configured with a plurality of depressions 22 and 24.

End mill 10 includes a plurality of helical flutes; in the present illustrative (and non-restrictive) example, there are four such flutes 1-4, extending (with respect to a general axial direction) from end face 6 to terminal end 7 of the cutting tool portion. The terminal end 7 is adjacent to a shank 9 to be secured by a machine tool during rotation of end mill 10.

Depressions 22 and 24 are configured to counteract the heating of chips, to the extent these are generally formed in response to the cutting action of peripheral cutting edge 17 during a milling operation, as well as the heating of corresponding flute surfaces. A row 33 of depressions 22 and a row 34 of depressions 24 are formed within, and recessed into, a corresponding inner flute surface. (For purposes of visibility in the drawings, these may appear to be protruding from the surface, but indeed should be understood as being recessed into the surface.) Rows 33 and 34 of depressions 22 and 24, respectively, can generally occupy 50-80% of the inner surface of a given flute. As will be further appreciated below, depressions 22 may be regarded as "rake face depressions" while depressions 24 may be regarded as "flute back depressions".

Depressions 22 and 24 may be configured in any desired fashion, such as via a polygonal shape (e.g., a rectangular or triangular shape), or circular (or elliptical) shape, or a prospective combination thereof. Depressions 22 and 24 may be formed by various material removal processes, such as grinding and laser cutting. It will be appreciated that the polygonal shape need not necessarily be characterized by sharp vertices, but rather a depression border may be configured with a curve at adjoining sides.

Each depression in a row may be evenly spaced and of the same general outer two-dimensional shape (or outline). Alternatively, the spacing between adjacent depressions may vary for any given pair of depressions in the same row or between adjacent rows. For example, an internal dimension of a depression may progressively increase or decrease with respect to other depressions along the same row. Also, the two-dimensional shape or outline of different depressions in the same row or in adjacent rows may vary. An arrangement of differently dimensioned or differently configured depressions will be referred to herein as a "pattern".

If so desired, only a single depression, or a limited number of depressions, may be provided in each row. Alternatively, end mill 10 may be devoid of one or the other sets of depressions 22 or depressions 24.

Upon introduction of cooling liquid into the flutes, the cooling liquid will collect in depressions 22 and 24, to cool both the flute surfaces and the chips. This will also serve to lubricate the chips and to thereby promote their sliding progression within a flute until they are discharged therefrom. As will be appreciated more fully herebelow, the increased dwelling time of the cooling liquid within a flute—that is afforded by the depressions—will help to significantly increase the rate of heat dissipation.

As such, heated cooling liquid, to which heat has been transferred from chips after their being cut, is ejected from the depressions as a result of being exposed to centrifugal action during rotation of end mill 10 about its longitudinal axis. Generally, the dwelling time of cooling liquid within a depression will be at least a rough function of the rotational speed of the tool.

Generally, the tool life of many conventional cutting tools can be highly limited in that they are often subjected to overheating during a machining operation. Experimentation has revealed that a solid end mill made of solid carbide, and formed with prearranged depressions as broadly contemplated herein, increased tool life by a factor of more than two, relative to conventional tools whose flute backs and flute rake faces were not recessed.

Figure 2:
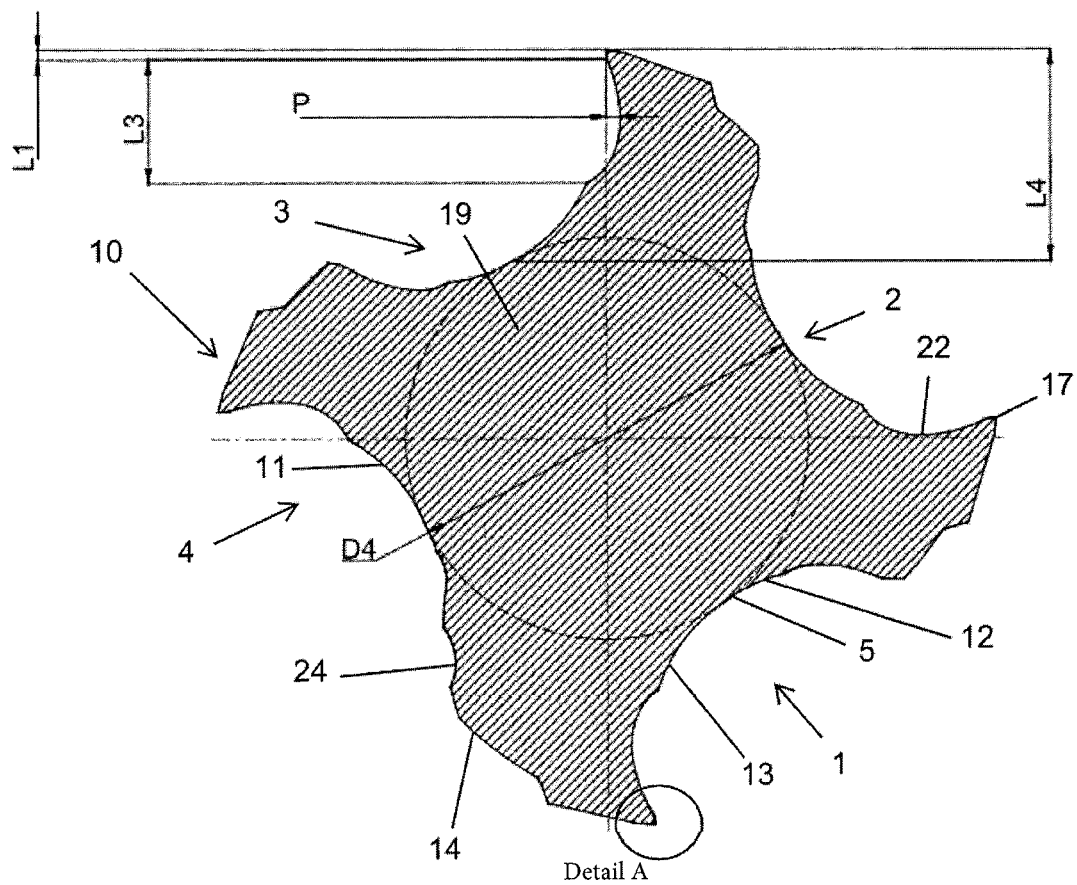
FIG. 2 is a cross sectional view of the cutting tool of FIG. 1, cut along a plane which is perpendicular to the longitudinal axis thereof.

Reference is now made to FIG. 2, which illustrates a transverse cross section of end mill 10 to show the structure of various depressions. As such, each of the four flutes 1-4 can be understood as being bounded by a continuous concave flute face surface 11 prior to being formed with the depressions. The solid core diameter 19 of end mill 10, having a diameter D4, effectively divides each flute face surface at a single point of coincidence 5 into two regions conventionally referred to as: (1) a rake face 13, radially extending from one peripheral cutting edge 17 to point 5; and (2) a flute back 12 extending from the heel 14 of another peripheral cutting edge 17, which faces away from the direction of rotation of end mill 10 and separates two adjacent flutes from each other, to point 5.

As shown, recessed from rake face 13 is a rake face depression 22. Rake face depression 22 is positioned within sufficient proximity of a peripheral cutting edge 17 so as to effect cooling, i.e., to dissipate heat resulting from friction derived from cutting. Recessed from flute back 12 is a flute back depression 24, itself positioned within sufficient proximity of a region of the flute back that would be prone to become heated as a result of frictional contact between chips and a flute back during chip evacuation from the flute. Depressions 22 and 24 have a maximum depth P ranging from 50-3000 microns, and preferably greater than 2% of the tool diameter, for example greater than 8% of the tool diameter.

Exemplary maximum depths range from about 0.05 mm to 1.1 mm or from 0.2 to 1.4 mm. A maximum depth for a tool diameter of 16 mm may be 0.07 mm, 0.24 mm, 0.34 mm, 0.46 mm, 0.48 mm, 0.65 mm, or 0.86 mm. The maximum depth for a tool diameter of 25 mm may be 0.11 mm, 0.27 mm, 0.41 mm, 0.64 mm, or 1.03 mm.

It can be appreciated from FIG. 2 that, by way of illustrative and non-restrictive example, a depression 22/24 may assume a shape of a trough, when viewed in transverse cross-section. This is provided merely by way of example, yet it has also been found that such a trough-like shape can be especially beneficial in helping carry out various functions of the depressions 22/24 as broadly described herein (e.g., promoting the retention of cooling fluid, inhibiting the retention of chips as they pass along the flute surfaces, etc.).

Rake face 13 is discontinuous due to the presence of rake face depressions 22. The radial dimension of the continuous and uninterrupted portion of rake face 13, at a cross sectional cut through a depression 22, is significantly less than that of a conventional rake face. The proximity L1 of a rake face depression 22 relative to the peripheral cutting edge 17 (by way of effecting cooling), generally equal to the radial dimension of an uninterrupted rake face rib, is no less than 0.05 mm and may be as much as 0.5 mm, for example 0.3 mm.

Figure 3:
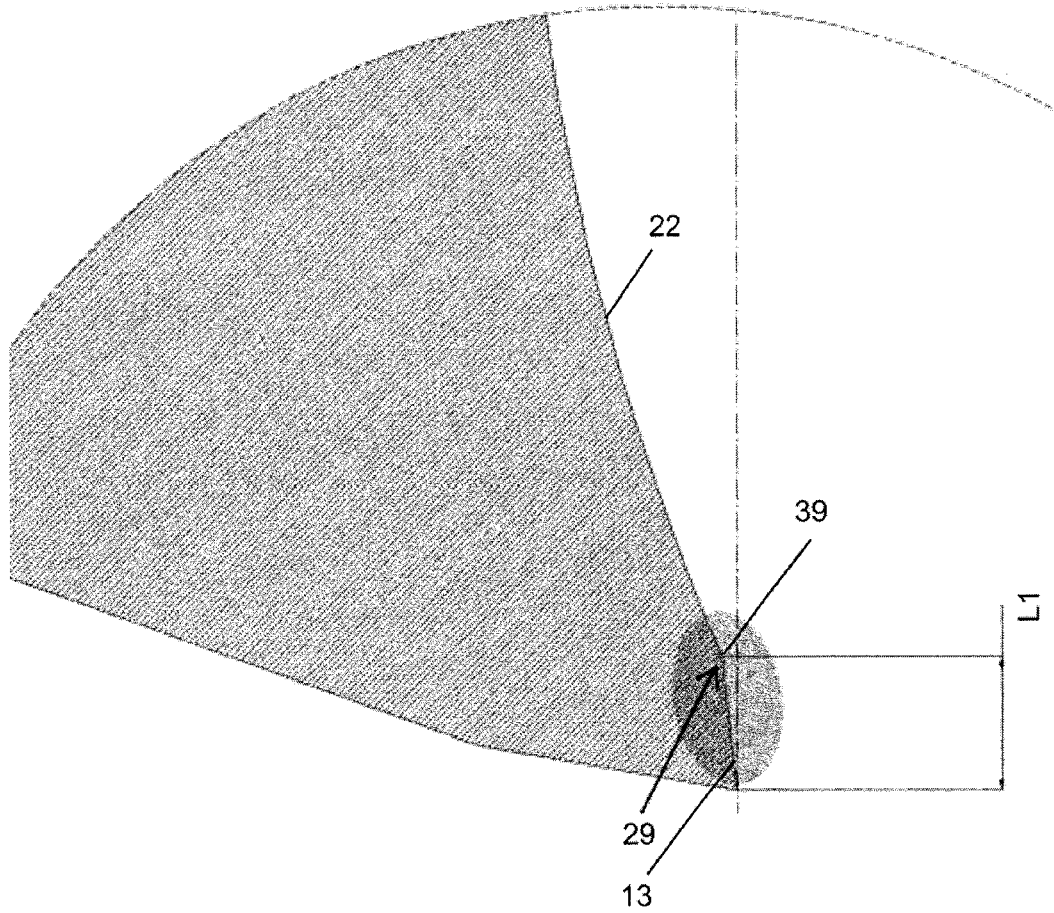
FIG. 3 is an enlargement of Detail A of FIG. 2, on which there is superimposed a schematic representation of a secondary shear zone being localized during periods of chip formation.

As shown in FIG. 3, the radial dimension L1 of the continuous portion of rake face 13 that adjoins the peripheral cutting edge can be advantageously selected such that the intersection 39 between rake face 13 and flute face depression 22 coincides with a secondary shear zone 29.

Generally, it should be noted that there is a widely accepted and recognized model to for describing a chip formation process, wherein a chip is formed in two zones; these are commonly referred to as the "primary shear zone" and the "secondary shear zone". The primary shear zone represents that zone extending from the cutting edge to the portion of the workpiece surface where the workpiece is sheared to form a chip; here, the workpiece undergoes plastic deformation, and heat is thereby generated due to energy dissipation from the plastic deformation. Chip formation thus begins at the primary shear zone, ends up at the secondary shear zone, and then flows along one or more flute surfaces. Accordingly, heat is generated within the secondary shear zone at the tool-chip interface due to deformations in the uncut material (e.g., via a combination of shearing and friction on the rake face), and the heat is largely absorbed by one or more flute surfaces. The secondary shear zone is generally characterized by two regions: (1) a sticking region in the vicinity of the cutting edge, where the chip tends to adhere to the rake face, and (2) a sliding region which is spaced further from the cutting edge than is the sticking region.

Generally, the secondary shear zone 29 is indeed associated with a large degree of heat buildup at rake face 13, and from the formed chip which passes therealong to flute back 12 (due to the transformation of frictional energy to heat). However, in accordance with embodiments of the invention, the temperature increase within secondary shear zone 29 is advantageously reduced relative to conventional cutting tools. This occurs, at least in part, as a result of rake face 13 being exposed to the reduced temperature of intersection 39, which itself is cooled by an adjacent rake face depression 22 and the cooling liquid trapped therewithin (or, e.g., by the passage of relatively cool air).

Inasmuch as the location of rake face depression 22 is selected to coincide with secondary shear zone 29, and particularly at its radially inward portion, at a sliding region of the zone, the presence of rake face depression 22 advantageously promotes reduced friction at the tool-chip interface by virtue of a reduction in chip-flute contact area. Thus, when a formed chip is urged into a flute interior after passing along the rake face, friction at the tool-chip interface is significantly reduced due the absence of material at a depression and the corresponding lack of friction force generation. It can thus also be appreciated that a friction-reducing capability of rake face depression 22 is facilitated even if no cooling liquid is trapped therewithin.

Figure 4:
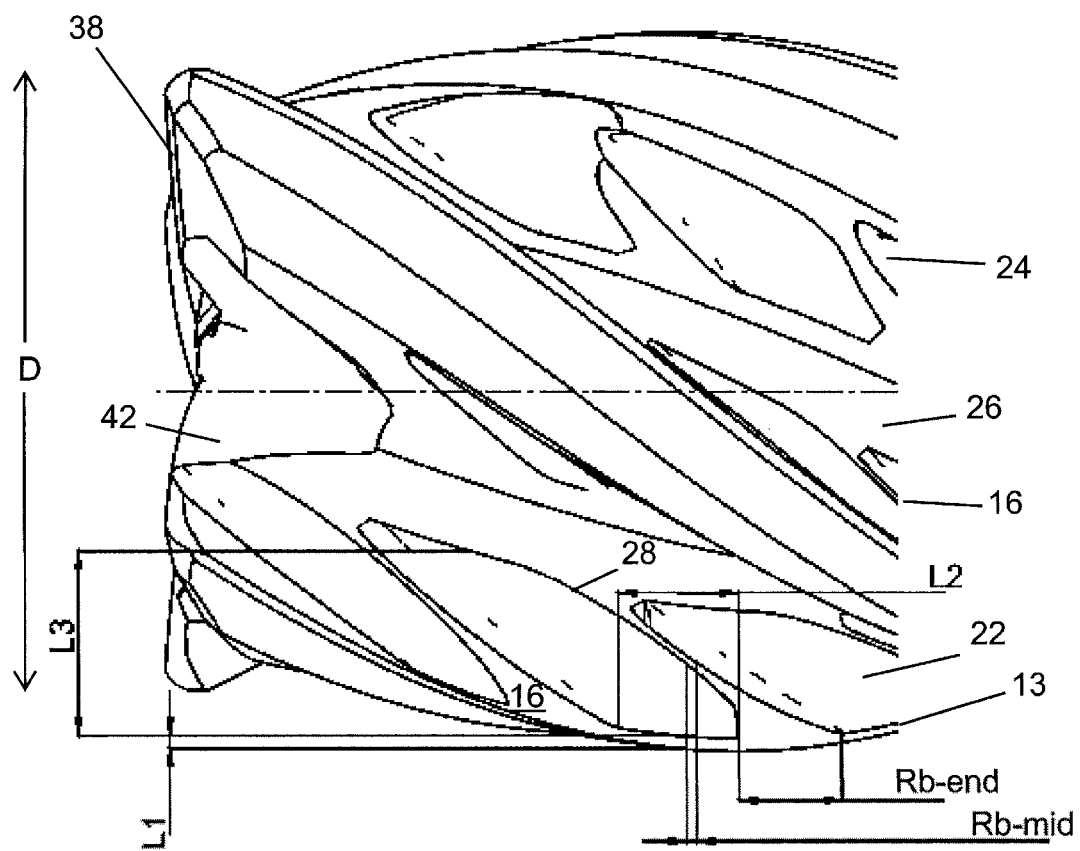
FIG. 4 is an enlargement of the cutting head of FIG. 1, taken at another side view, showing the configuration of ribs between depressions and between rows of depressions ribs.

In accordance with embodiments of the invention, measures are taken to ensure that despite the absence of material at a rake face and/or flute back depression, a formed chip will not be received within the interior of a depression to detract from the cooling (and friction-reducing) capabilities of the depression. As such, ribs 16 and 26 can be provided as shown in FIGS. 1 and 4, to support (with the assistance of rake face 13) a formed chip while it is introduced into, and subsequently discharged from, a cutting tool along the flute interior. Also, it can be noted that the dimensions of a formed chip, for example its length and width, can generally be greater than a corresponding dimension of three or four depressions. Thus, the clogging of depressions will largely be prevented as a result of the combination of small depression size (relative to chip thickness) with the chip-supporting ribs.

Additionally, the passage of chips through a flute interior generally does not progress in perpendicular to the (longitudinal) tool axis, but rather ends up progressing in a direction substantially perpendicular to the peripheral cutting edge; thus, this generally follows the helical angle of the flute (itself generally ranging from 20-55 degrees), thus a chip will end up being supported by a plurality of ribs while being introduced into a flute interior.

above, embodiments of the invention ensure the capability of a rib to retain the structural integrity of the flute face despite the removal of material therefrom in forming the recessed depressions. As such, and as illustrated in FIG. 4, the axial dimension Rb-mid of an inter-depression rib 16, as measured at an intermediate portion of a border 28 that is generally, but not necessarily, very close to an adjacent depression, has a minimum value of 0.001 mm, to provide for both the dimensional stability and cooling capability of each rake face depression 22 and flute back depression 24. The maximum value for axial dimension Rb-mid may be (for example) up to 0.5-1.0 mm. The axial dimension Rb-end of an inter-depression rib 16, as measured at an end portion of a border 28 corresponding to a junction of two borders that extend in different directions and which is generally greater than Rb-mid, has a minimum value of 0.1 mm, and has a maximum value (for example) of 1 mm, or (for example) ranges from 0.2 mm to 25% of the tool diameter D. The minimum radial dimension of an inter-row rib 26 may be equal to the axial dimensions Rb-mid and Rb-end, as measured at intermediate and end portions, respectively, of a border. These rib dimensions are generally, but not necessarily, measured at a corresponding portion of a depression border 28 of an adjacent depression.

To ensure sufficient cooling ability of a depression, the axial internal dimension L2 of a depression is up to 75% of the axial length of peripheral cutting edge 17 (FIG. 1), and may range from 0.3 mm to 100% of the tool diameter D. Also, the radial internal dimension L3 of a depression is greater than 0.2 mm, for example ranging from 0.5 mm to 100% of the flute interior radial dimension L4 (FIG. 2) as measured from the peripheral cutting edge to the heel, and preferably 10-70% of flute interior radial dimension L4. Alternatively, the radial internal dimension L3 of a depression is up to 40% of a tool diameter D. The flute interior radial dimension L4 is dependent upon the geometry of the given tool, being equal to half the difference between tool diameter D and core diameter D4. A depression of defined dimensions is thus able to sufficiently trap cooling liquid within its interior.

Another source of heat generation that contributes to excessive tool wear is at an end face cutting edge 38. Thus, the flute face and flute back depressions may also serve to cool an end face cutting edge 38 by being positioned within sufficient proximity of end face cutting edge 38 to effect cooling. "Cooling-effecting" proximity of end face cutting edge 38 may be ensured when a depression is contiguous to the end face gash 42 which is adjacent to end face cutting edge 38, or at least axially spaced by a distance that is within 150%, e.g., 25%, of tool diameter D from end face gash 42 which is adjacent to end face cutting edge 38.

In a variant embodiment, the location of each depression may be pinpointed to coincide with known regions of significant heat generation that are specific to the given cutting tool while taking into account the cutting tool material, workpiece material, cutting tool dimensions, cutting speed, depth of cut and any other known or designed parameters. A predetermined pattern of depressions may therefore be programmed with a dedicated software tool to optimize the temperature and friction reducing characteristics of the cutting tool. After a first predetermined number of cutting tools have been produced with a first pattern, for use by example to produce a desired product, the software tool may be quickly reconfigured to direct the machine tool to produce a second predetermined number of cutting tools with a second pattern. Thus, the depression pattern of a cutting tool may be customized according to customer or manufacturer demands.

FIGS. 5-13 illustrate nine different depression patterns, respectively.

Figure 5:
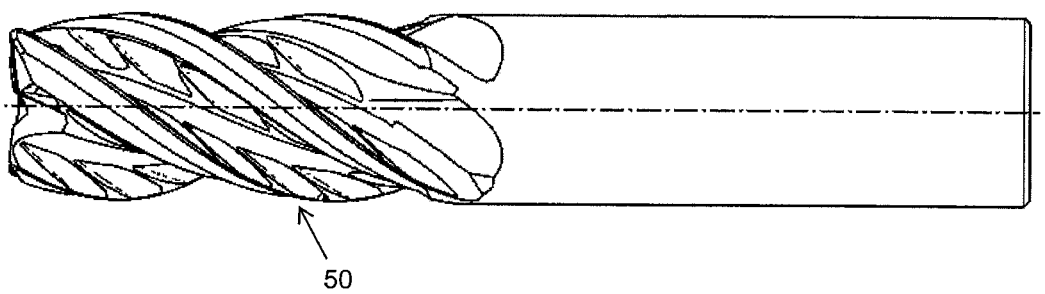
FIGS. 5-13 illustrate respective side views of nine different cutting tools, respectively, each formed with a different pattern of depressions.
Figure 6:
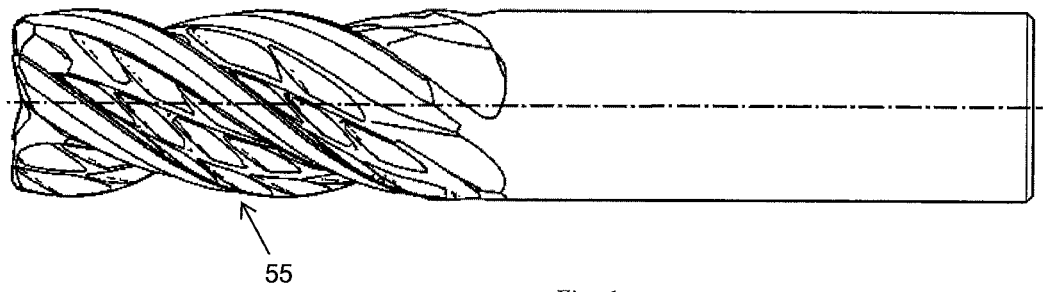
Figure 7:
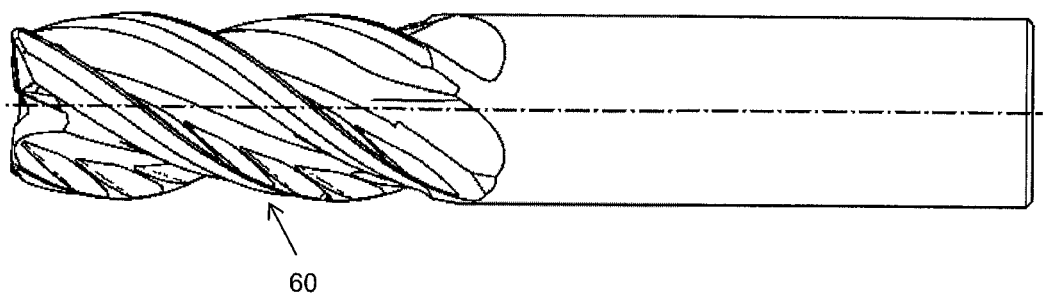
Figure 8:
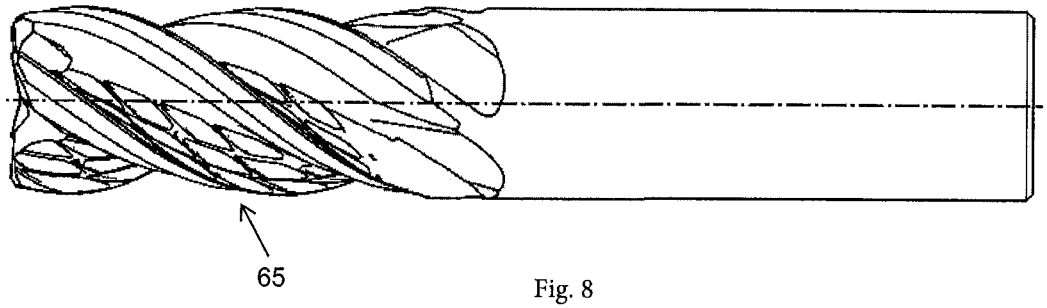
Figure 9:
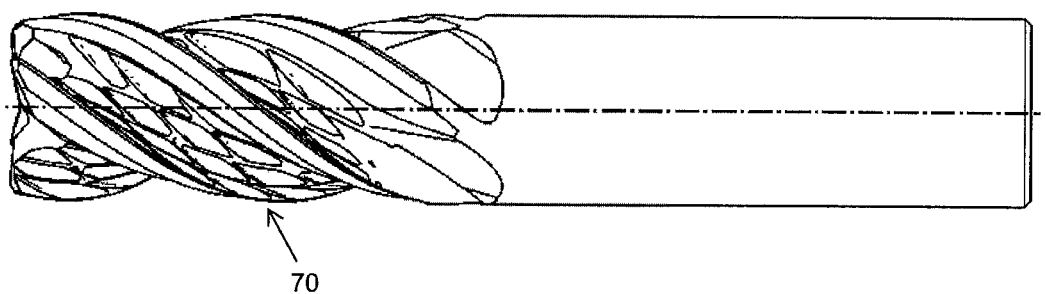
Figure 10:
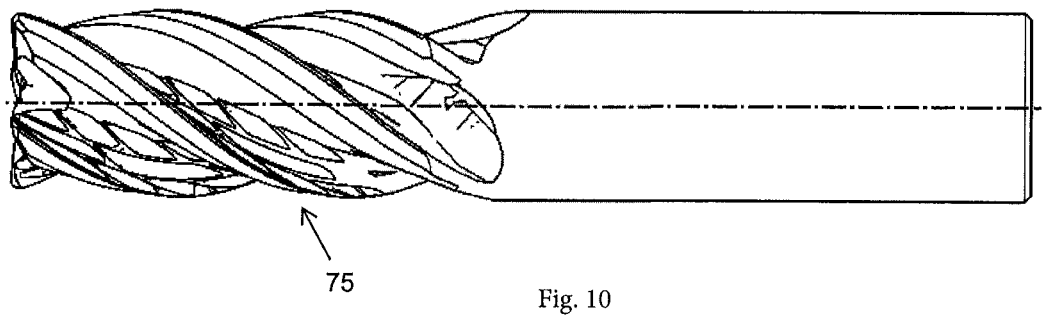
Figure 11:
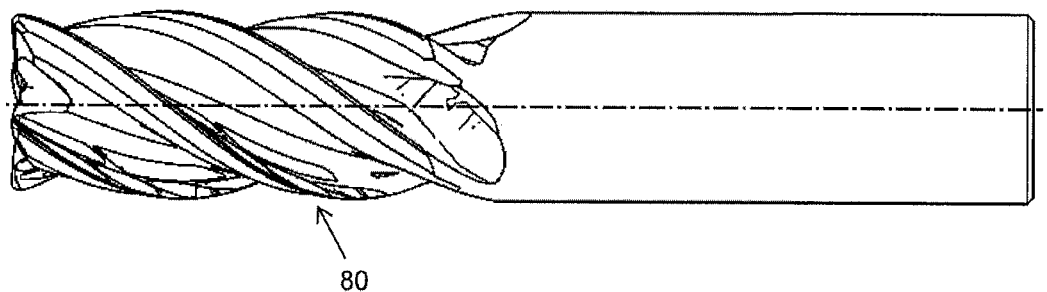
Figure 12:
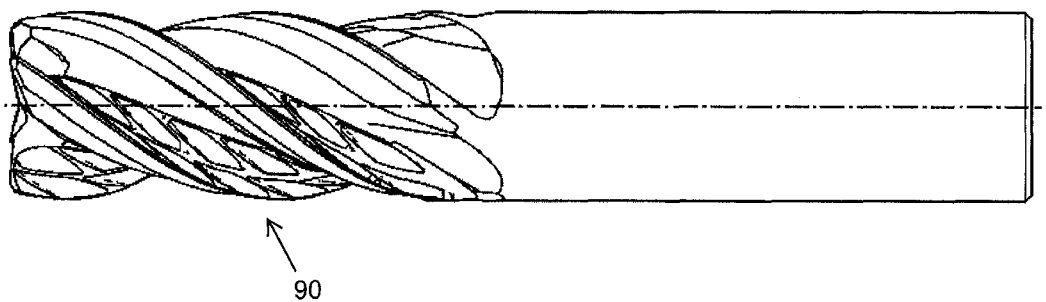
Figure 13:
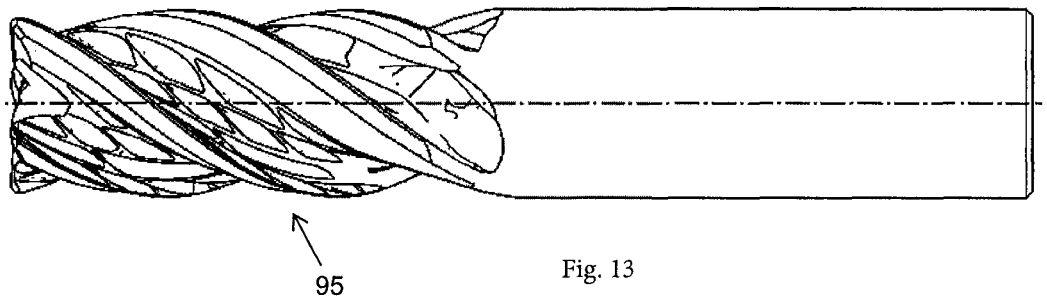

In FIG. 5, a row of rake face depressions and a row of flute back depressions define pattern 50. In FIG. 6, three rows of depressions that are recessed from the flute face define pattern 55. In FIG. 7, one row of rake face depressions defines pattern 60. In FIG. 8, three rows of depressions spaced from the heel define pattern 65. In FIG. 9, four rows of depressions define pattern 70. In FIG. 10, three rows of depressions including one row having an elongated depression define pattern 75. In FIG. 11, two rows of depressions spaced from the heel including one row of elongated patterns define pattern 80. In FIG. 12, two rows of depressions spaced from the heel define pattern 90. In FIG. 13, four rows of depressions define pattern 95.

The following non-limiting experimental examples demonstrate a typical increase in tool life that can be anticipated due to the influence of depressions as broadly contemplated and discussed herein.

EXAMPLE 1

An end mill having a diameter of 12 mm was used to cut a stainless steel workpiece with high tensile strength by an axial depth of cut into the workpiece surface of 12 mm, a width of cut of 6 mm, at a cutting speed of 80 m/min when an end mill cutting edge was brought in engagement with a workpiece surface, and a feed rate of workpiece movement toward the end mill of 0.05 mm/min per tooth. While a conventional end mill having smooth and completely unrecessed flutes had a tool life duration of 23 minutes until experiencing a predetermined degree of wear that is indicative of tool failure, an end mill as broadly contemplated herein, configured in this case with three depressions per row, had a tool life of 92 minutes until experiencing the same degree of wear after cutting the same type of workpiece.

EXAMPLE 2

An end mill having a diameter of 12 mm was used for side milling of a stainless steel workpiece with high tensile strength by an axial depth of cut into the workpiece surface of 12 mm, a width of cut of 6 mm, at a cutting speed of 80 m/min, and a feed rate of 0.05 mm/min per tooth. While a conventional end mill having smooth and completely unrecessed flutes developed excessive chipping after cutting workpieces by an accumulated linear dimension of 9.8 m, an end mill as broadly contemplated herein, configured with depressions, did not suffer from any damaged peripheral or end cutting edges after cutting the same type of workpiece for the same accumulated linear dimension.

In brief recapitulation, it can be appreciated from the foregoing that at least one embodiment of the present invention provides for a fluted cutting tool used for peripheral cutting operations, the tool comprising a plurality of flutes. Each of the flutes can have a flute face radially extending from a rake face that adjoins a corresponding peripheral cutting edge, and can be configured with at least one depression for promoting cooling. The at least one depression can be recessed into the flute face, whereby the rake face becomes interrupted to facilitate a reduction in chip-flute contact area.

Further, at least one embodiment of the present invention provides for the at least one flute face depression: being completely surrounded by one or more unrecessed ribs define borders of an interior, within which cooling liquid can be trapped; and defining sufficient space such that an axial length of the depression interior is up to 75% of the axial length of the peripheral cutting edge and a radial length of the depression interior is greater than 0.2 mm and up to 40% of a tool diameter of the cutting tool. Further, this at least one depression can be spaced from the peripheral cutting edge by a rake face rib having a dimension of no less than 0.05 mm.

Additionally, at least one embodiment of the present invention provides for each rake face depression to have a maximum depth ranging from 50-3000 microns.

In one aspect, at least one embodiment of the invention provides for an intersection between the rake face and the rake face depression to coincide with a secondary shear zone at a tool-chip interface where chips of a workpiece are formed, to maximize heat and friction reduction. The intersection between the rake face and the rake face depression can be spaced from the peripheral cutting edge by a dimension of no more than 0.3 mm.

Further, at least one embodiment of the invention provides for a fluted cutting tool, comprising a plurality of flutes each having a flute surface and configured with at least one depression configured for promoting cooling and recessed into the flute surface. The at least one depression can have a depression interior which: has a depression interior with two different dimensions, excluding a depth of the interior, of at least 0.3 mm, within which cooling liquid can be trapped, and is located within sufficient proximity of at least one of the cutting edges to influence cooling.

In one aspect, at least one embodiment of the invention provides for a depression—that is located within sufficient proximity of an end face cutting edge to influence cooling—to be axially spaced by a distance that is within 150% of the tool diameter from an end face gash (which itself is adjacent to the end face cutting edge).

Furthermore, at least one embodiment of the present invention is directed to a method for maximizing heat dissipation during a material removal operation performed with a fluted cutting tool. Such a method can include forming at least one depression for promoting cooling, recessed into a flute surface of the cutting tool at a corresponding region of the flute surface which is anticipated to be friction prone during the material removal operation due to one or more of: a predetermined tool cutting speed, a predetermined workpiece feed speed, type of cutting tool material, type of workpiece material, and number of flutes of the cutting tool. As such, the at least one depression can be completely surrounded by one or more unrecessed ribs to define a depression interior having two different dimensions parallel to the flute surface of at least 0.3 mm within which cooling liquid can be trapped. The machine tool can be operated such that the cutting tool is coupled therewith at the predetermined tool cutting speed and the predetermined workpiece feed speed, to thereby initiate the material removal operation with respect to the workpiece. Chips formed during the material removal operation can be caused to flow along the flute surface and across each of the at least one depression while being supported by the one or more ribs adjoining each of the at least one depression until being discharged from a given flute, to facilitate an increase an increase in heat dissipation as a result of a reduction in chip-flute contact area.

In one aspect of at least one embodiment of the invention, a customized pattern of the depressions is formed, preferably in conjunction with a software tool, so as to be recessed from the flute surface and to coincide with corresponding friction-prone regions.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A cutting tool comprising:
   a plurality of peripheral cutting edges extending in an axial direction along a radially outward portion of the cutting tool and a flute disposed between two adjacent peripheral cutting edges, the flute including a flute surface comprising a rake face extending radially inward from each of the plurality of peripheral cutting edges to a point of coincidence and a flute back extending from the point of coincidence to a heel of an adjacent peripheral cutting edge;
   a first, single row of depressions recessed into the rake face of the flute surface and extending in the axial direction of the cutting tool, each depression of the first, single row of depressions defined by a depth, P, an axial internal dimension, L2, and a radial internal dimension, L3, the first, single row of depressions having a first configuration;
   and a second, single row of depressions recessed into the flute back of the flute surface and extending in the axial direction of the cutting tool, each depression of the second, single row of depressions defined by the depth, P, the axial internal dimension, L2, and the radial internal dimension, L3, the second, single row of depressions has a second configuration different than the first configuration, wherein each depression of the first, single row of depressions has an axially forward-most end and an axially rearward-most end, the axially forward-most end being radially inward with respect to the axially rearward-most end, and wherein the axially forward-most end of one depression of the first, single row of depressions overlaps the axially rearward-most end of an adjacent depression of the first, single row of depressions, and wherein each depression of the second, single row of depressions has an axially forward-most end and an axially rearward-most end, the axially forward-most end being radially outward with respect to the axially rearward-most end, and wherein the axially forward-most end of one depression of the second, single row of depressions overlaps the axially rearward-most end of an adjacent depression of the second, single row of depressions.

2. The cutting tool of claim 1, wherein a radial dimension, L1, is selected such that an intersection between the rake face and each depression of the first, single row of depressions recessed into the rake face lies within a secondary shear zone.

3. The cutting tool of claim 2, wherein the radial dimension, L1, is greater than 0.05 mm and less than 0.50 mm.

4. The cutting tool of claim 1, wherein the axial internal dimension, L2, is in a range between 0.3 mm to 100% of a tool diameter, D, of the cutting tool.

5. The cutting tool of claim 1, wherein the radial internal dimension, L3, is greater than 0.2 mm.

6. The cutting tool of claim 1, wherein the radial internal dimension, L3, is up to 40% of a tool diameter, D, of the cutting tool.

7. The cutting tool of claim 1, wherein the depth, P, is in a range between 50 microns and 3000 microns.

8. The cutting tool of claim 1, wherein the depth, P, is greater than 2% of a tool diameter, D, of the cutting tool.

9. The cutting tool of claim 1, wherein each depression of the first, single row of depressions recessed into the rake face is at least partially surrounded by one or more ribs.

10. The cutting tool of claim 9, wherein the one or more ribs have an axial dimension, Rb-mid, equal to or greater than 0.001 mm and less than or equal to 1.0 mm.

11. The cutting tool of claim 1, wherein each depression of the second, single row of depressions recessed into the flute back is at least partially surrounded by one or more ribs.

12. The cutting tool of claim 11, wherein the one or more ribs have an axial dimension, Rb-mid, equal to or greater than 0.001 mm and less than or equal to 1.0 mm.

13. The cutting tool of claim 1, wherein the first, single row of depressions and the second, single row of depressions occupy 50-80% of the flute surface.

14. The cutting tool of claim 1, wherein the cutting tool further comprises an end face cutting edge and an end face gash adjacent the end face cutting edge, and wherein a depression of the first, single row of depressions recessed into the rake face is axially spaced by a distance that is less than 150% of a tool diameter, D, of the cutting tool, from the end face gash.

15. The cutting tool of claim 1, wherein the cutting tool further comprises an end face cutting edge and an end face gash adjacent the end face cutting edge, and wherein a depression of the second, single row of depressions recessed into the flute back is axially spaced by a distance that is less than 150% of a tool diameter, D, of the cutting tool, from the end face gash.

16. The cutting tool of claim 1, wherein the cutting tool comprises an end mill.

* * * * *